(12) United States Patent
Ura et al.

(10) Patent No.: US 7,022,971 B2
(45) Date of Patent: Apr. 4, 2006

(54) LASER MEASUREMENT APPARATUS

(75) Inventors: Haruo Ura, Takamatsh (JP); Makoto Ono, Takamatsu (JP); Yasuomi Ohno, Takamatsu (JP)

(73) Assignee: Soatec Inc., Kagawa (JP)

(*) Notice: Subject to any disclaimer, the term of this patent is extended or adjusted under 35 U.S.C. 154(b) by 3 days.

(21) Appl. No.: 10/823,319

(22) Filed: Apr. 13, 2004

(65) Prior Publication Data

US 2004/0232317 A1    Nov. 25, 2004

(30) Foreign Application Priority Data

May 19, 2003  (JP)  ............................. 2003-140673

(51) Int. Cl.
*G06M 7/00*    (2006.01)

(52) U.S. Cl. ................. 250/221; 250/203.2; 356/141.4

(58) Field of Classification Search .. 250/203.1–203.3, 250/203.6, 203.7, 206.1, 206.2, 221, 222.1; 356/139.01–139.07, 141.1, 141.3, 141.4, 356/614
See application file for complete search history.

(56) References Cited

U.S. PATENT DOCUMENTS 4,516,853 A * 5/1985 Pearson ................. 356/139.08

6,734,412 B1 * 5/2004 Kumagai et al. ......... 250/206.2

FOREIGN PATENT DOCUMENTS

JP    2002-082045    3/2002
JP    2002-181533    6/2002

* cited by examiner

*Primary Examiner*—Kevin Pyo
(74) *Attorney, Agent, or Firm*—Renner, Otto, Boisselle & Sklar, LLP (57) ABSTRACT

In a laser measurement apparatus capable of measuring a moving object or a designated object to be measured by tracking an object to be tracked and detecting the position of the tracked object as needed, optical signal processing units 103 through 105 output laser beams having different wavelengths via a common optical path A toward a corner cube 100 attached to an object to be measured, and detect the laser beams being reflected on the corner cube 100. A control unit 102 controls motors 110, 111 so that the laser beams return to a predetermined position of an optical position sensitive detector 117 of an optical signal processing unit 103, by which the direction of a reflecting mirror 112 is controlled so that the laser beams track the object. The control unit 102 computes the distance, shape, position, speed etc. of the object to be measured based on signals detected via the optical signal processing units 104, 105 while having the laser beams output from optical signal processing units 104, 105 track the object to be tracked.

7 Claims, 6 Drawing Sheets

LASER MEASUREMENT APPARATUS

The present application claims priority from Japanese patent application No. 2003-140673 filed on May 19, 2003, the content of which is hereby incorporated by reference into this application.

FIELD OF THE INVENTION

The present invention relates to a laser measurement apparatus that measures an object using laser beams, and especially, relates to a laser measurement apparatus that measures an object to be measured while tracking a predetermined object to be tracked.

DESCRIPTION OF THE RELATED ART

Heretofore, laser measurement apparatuses have been developed that perform various types of measurement, such as the measurement of a distance to an object to be measured from a predetermined point, the measurement of a shape of an object, the measurement of a speed of a moving object, or the measurement of a distance between plural points (refer for example to Patent document 1 and Patent document 2).

By using laser beams, it is possible to measure with high accuracy the distance to the object to be measured from a certain point, the shape of the object, the moving speed, the distance between plural points and so on from a remote location from the object to be measured.

Patent Document 1:
  Japanese Patent Application Laid-Open No. 2002-82045

Patent Document 2:
  Japanese Patent Application Laid-Open No. 2002-181533

However, when the object to be measured is moving, the distance to the object from a predetermined point changes with time, and even the speed at which the object is moving may change momentarily, so there are demands for an apparatus that performs measurement while tracking the moving object.

Also, there are demands for an apparatus that is capable of designating the object to be measured at a remote location from the object and measuring the designated object from that location. There are further demands for an apparatus that is capable of measuring an object positioned at a location where a specific event occurs such as where a specific color or sound is generated.

SUMMARY OF THE INVENTION

In consideration of the above demands, the present invention aims at providing a laser measurement apparatus using laser beams to perform measurement that is capable of measuring a moving object or a designated object by tracking an object to be tracked and detecting the position of the object to be tracked whenever necessary.

The present invention provides a laser measurement apparatus comprising: a measuring laser beam generating means for outputting a measuring laser beam used for measuring a property of an object to be measured; an optical guiding means for controlling the direction in which the measuring laser beam travels; a measuring means for measuring the property of the object to be measured using the measuring laser beam returning from the object to be measured; a position detecting means for detecting the position of an object to be tracked; and a control means for controlling the optical guiding means so that the measuring laser beam is radiated to the object to be tracked based on the position of the object to be tracked detected by the position detecting means; wherein the measuring means measures the property of the object to be measured using the measuring laser beam returning from the object to be measured in a state where the measuring laser beam is controlled to be radiated to the object to be measured. The measuring means measures the properties of the object to be measured using the measuring laser beam returning from the object to be measured in the state where the measuring laser beam is controlled to be radiated to the object to be measured.

According to one aspect of the invention, the position detecting means comprises a tracking laser generating means for radiating a tracking laser beam to the object to be tracked via the optical guiding means, and an optical position sensitive detector for detecting the tracking laser beam returning via the optical guiding means from the object to be tracked; and the control means controls the optical guiding means so that the tracking laser beam returning from the object to be tracked is returned to a predetermined position of the optical position sensitive detector.

According to another aspect of the invention, the optical guiding means includes an optical fiber cable.

According to another aspect of the invention, the position detecting means has a color identification device that detects a predetermined color via the optical guiding means, and the control means controls the optical guiding means so that the object to be tracked comprising the predetermined color is detected by the color identification device.

According to yet another aspect of the invention, the position detecting means has a sound detecting means for detecting a loudness and direction of a sound, and the control means controls the optical guiding means so that a predetermined sound set as the object to be tracked is detected by the sound detecting means.

According to another aspect of the invention, the apparatus further comprises an intimidating means for intimidating the direction from which the sound is detected when the sound detecting means detects the loudness and direction of a predetermined sound.

DETAILED DESCRIPTION OF THE PREFERRED EMBODIMENT

Now, a laser measurement apparatus according to a preferred embodiment of the present invention will be described with reference to the accompanied drawings. In the drawings, the same components are denoted by the same reference numbers.

Figure 1:
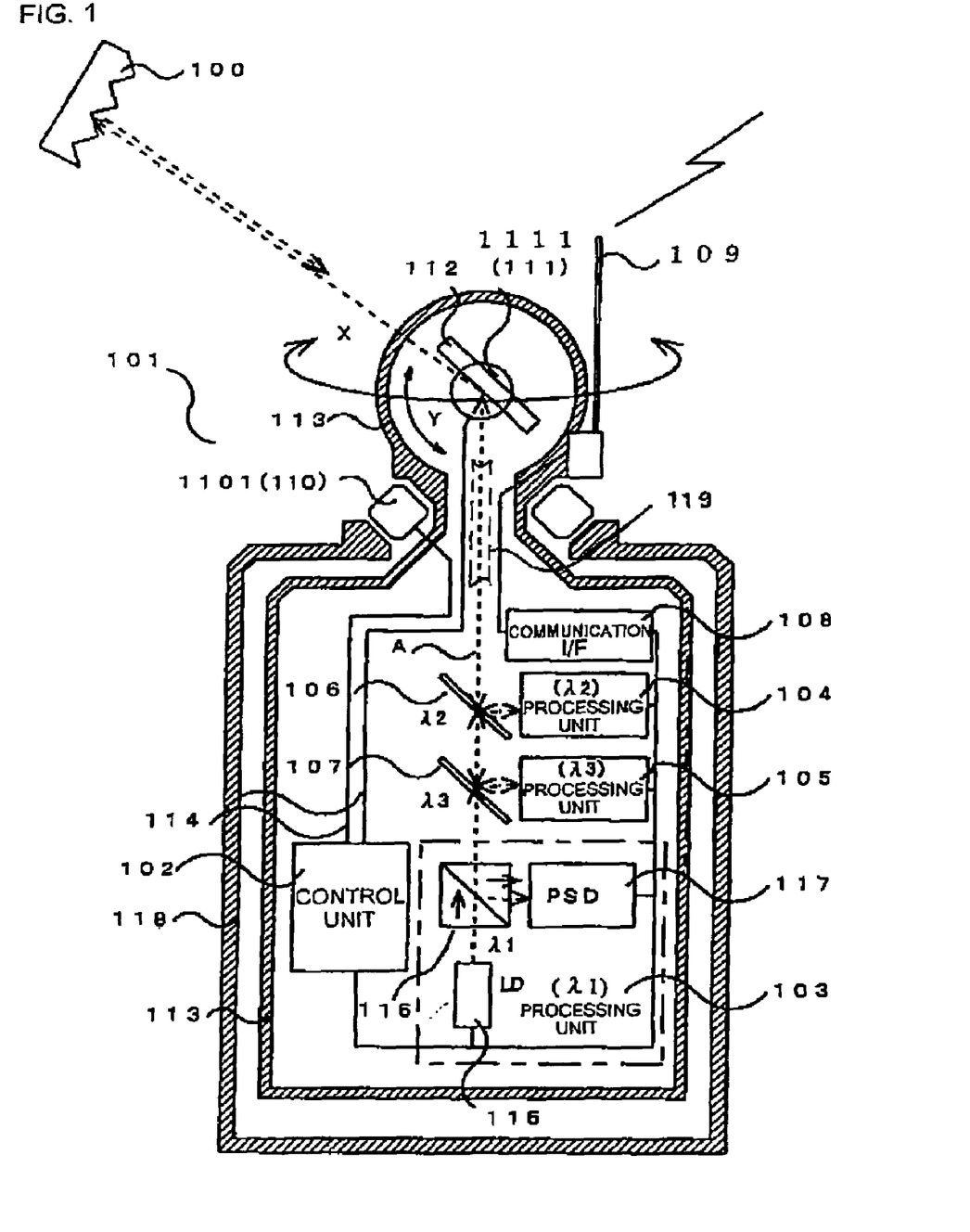
FIG. 1 is a schematic view of a laser measurement apparatus according to a first embodiment of the present invention.
Figure 2:
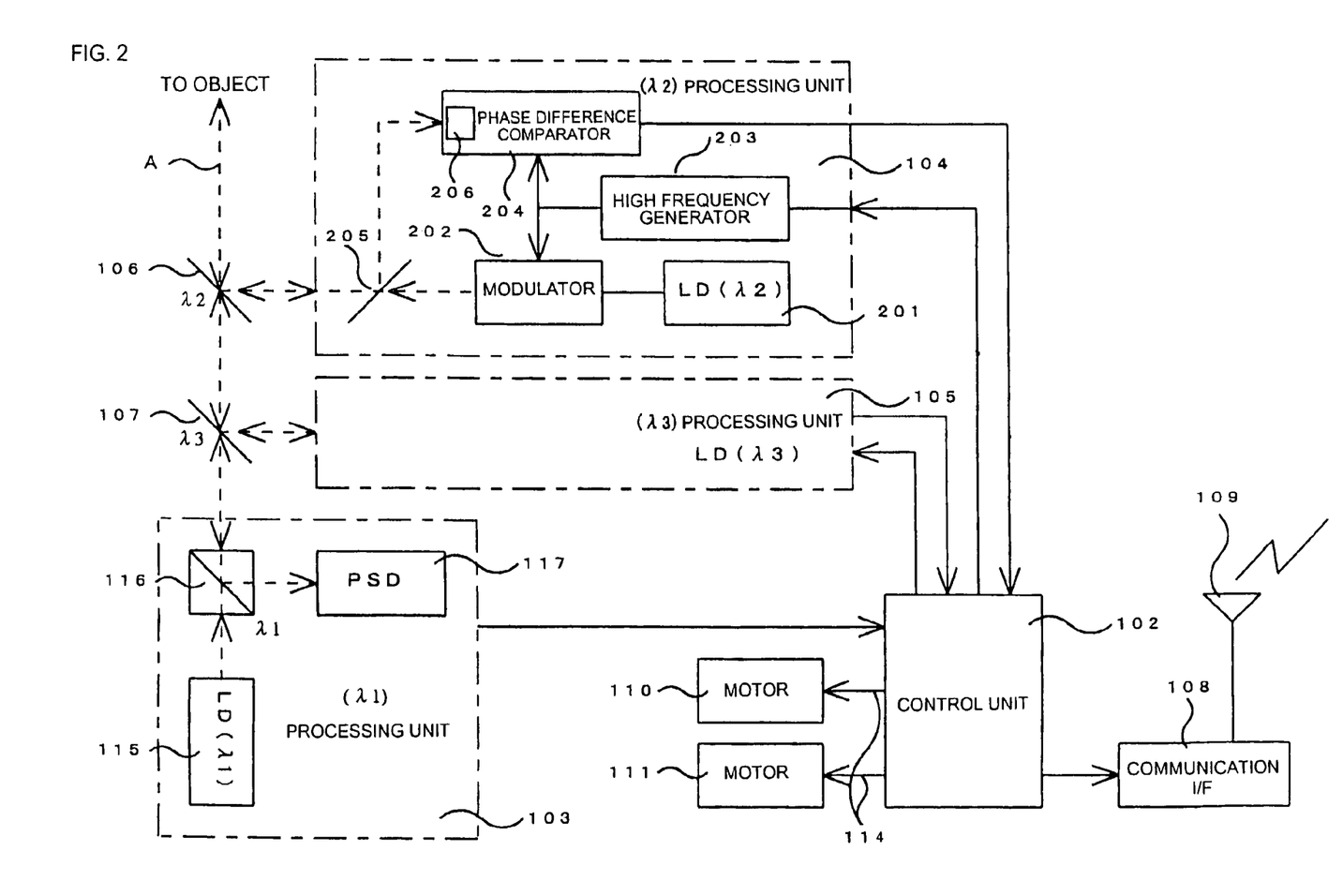
FIG. 2 is a block diagram showing a circuit and an optical system of the laser measurement apparatus according to the first embodiment of the present invention.

FIG. 1 is a schematic view of a laser measurement apparatus according to a first embodiment of the present invention, and FIG. 2 is a block diagram showing a circuit and an optical system of a laser measurement apparatus according to the first embodiment of the present invention.

According to FIGS. 1 and 2, a laser measurement apparatus 101 comprises a plurality of optical signal processing units 103, 104, 105, a plurality of optical filters 106, 107, a communication interface (I/F) 108 for data communication, an antenna 109, a plurality of motors 110, 111, a reflecting mirror 112 (wherein the motor 111 and the reflecting mirror 112 constitute a galvanometer mirror) and a control unit 102.

A main case 118 fixed to a determined position during use houses therein a movable case 113 that is capable of rotating in direction X (that is, within a plane orthogonal to the face of the sheet). Between the main case 118 and the movable case 113 is disposed a rotary drive unit 1101 with an encoder function and including the motor 110, and the movable case 113 is driven by the rotary drive unit 1101 to rotate in direction X.

The movable case 113 houses the control unit 102, the plurality of optical signal processing units 103 through 105, the plurality of optical filters 106, 107, the communication I/F 108, a rotary drive unit 1111 with an encoder function and including the motor 111, and the reflecting mirror 112.

The reflecting mirror 112 is supported so as to be able to rotate in direction Y (that is, within a plane parallel to the face of the sheet) by the rotary drive unit 1111 including the motor 111. The center of rotation of the reflecting mirror 112 being rotated in direction Y by the motor 111 exists on an optical path A, and the rotation axis of the reflecting mirror 112 being rotated in direction Y by the motor 111 is formed to be orthogonal to the optical path A.

A laser beam traveling through the optical path A and reflected on the reflecting mirror 112 is output toward the direction of an object to be tracked (object to be measured). A reflecting member (such as a corner cube 100) is attached to a surface of the object to be measured, and the laser beam being reflected on the object (actually, the corner cube 100) is returned toward the laser measurement apparatus 101.

The rotation axis of the movable case 113 is formed to be parallel to the optical path A. In other words, the rotation axis of the movable case 113 is formed to be orthogonal to the rotation axis of the reflecting mirror 112 rotated by the motor 111. The rotary drive mechanisms 1101, 1111 has a rotary drive function for driving the movable case 113 and an encoder function to detect the amount of rotation of the movable case 113, and a rotary drive function for driving the reflecting mirror 112 and an encoder function to detect the amount of rotation of the reflecting mirror 112, respectively, and is capable of driving the movable case 113 and the reflecting mirror 112 to rotate continuously.

The control unit 102 controls the whole of the laser measurement apparatus 101, and also controls the components of the laser measurement apparatus 101, such as the motors 110 and 111. Moreover, the control unit 102 performs such processes as the tracking control of the object based on optical signals detected by the optical signal processing units 103 through 105, computation processes for computing the distance from a certain point to the object, the shape of the object, the position thereof, the traveling speed, the traveling direction, the distance to the object from a predetermined point, and so on.

The optical signal processing unit 103 comprises a laser beam generating unit (for example, a laser diode LD) 115 for outputting a laser beam having a first wavelength $\lambda 1$ (for example, 630 nm) to the optical path A, a polarized beam splitter 116 for transmitting a longitudinal wave (P wave) component of the laser beam being incident on the splitter from the laser beam generating unit 115 to the optical path A and reflecting a transverse wave (S wave) component of the laser beam being incident on the splitter from the outside via the optical path A toward an optical position sensitive detector (PSD) 117, and a PSD 117 for detecting the position of the laser beam comprising the transverse wave component output via the beam splitter 116. The polarized beam splitter 116 is disposed so as to correspond to the optical path A. The PSD 117 is equipped with a function to detect the position of the received laser beam, and outputs the positional information of the received laser beam as an output signal to the control unit 102. The laser beam output from the laser beam generating unit 115 is used as a tracking laser beam for tracking the object to be tracked.

The optical signal processing unit 104 comprises, as shown in FIG. 2, a laser beam generating unit (for example, a laser diode LD) 201 for outputting a laser beam having a second wavelength $\lambda 2$ (for example, 850 nm) that differs from the wavelength $\lambda 1$ of the laser beam utilized by the optical signal processing unit 103, a high frequency generator 203, a modulator 202 for modulating the laser beam output from the laser beam generating unit 201 according to the signal output from the high frequency generator 203 and outputting the same, a polarized beam splitter 205 for transmitting a longitudinal wave (P wave) component of the laser beam output from the modulator 202 to the optical path A and reflecting a transverse wave (S wave) component of the laser beam being incident on the splitter via the optical path A from the outside toward a phase difference comparator 204, and a phase difference comparator 204 including a photodetector (PD) 206 for detecting the laser beam comprising the transverse wave component output via the beam splitter 205, the comparator 204 outputting a signal corresponding to the phase difference between the signal detected by the photodetector 206 and the signal output from the high frequency generator 203.

The photodetector 206 detects the presence or absence of a laser beam of a predetermined level and above, and outputs a signal corresponding to the level of the laser beam. The optical signal processing unit 104 is for measuring a distance according to a first measurement scale (for example, a distance up to 100 m) which is a long distance. Thus, the laser beam $\lambda 2$ output from the laser beam generating unit 201 is used for measuring a distance according to the first measurement scale, or for measuring a large-sized object or an object at a remote location.

The optical signal processing unit 105 has a similar structure as the optical signal processing unit 104, except for the point that it outputs a laser beam having a third wavelength $\lambda 3$ (for example, 670 nm) that differs from the wavelengths $\lambda 1$ and $\lambda 2$ of the laser beams utilized by the optical signal processing units 103 and 104, and the point that the frequency of the output signal of the high frequency generator is different. The optical signal processing unit 105 is for measuring a distance according to a measurement scale that is different from the first measurement scale, such as a second measurement scale (for example, a distance up to 2 m) which is shorter than the first measurement scale. Thus, the laser beam λ3 output from the laser beam generating unit of the optical signal processing unit 105 is used for measuring a distance according to the second measurement scale, or for measuring a small-sized object or an object located nearby.

The optical filter 106 is a filter that reflects the laser beam of a second wavelength λ2 toward the optical signal processing unit 104 and for transmitting the beams having other wavelengths, and can be, for example, a frequency-dependent half mirror formed of a dichroic mirror. The optical filter 106 is disposed at an angle of 45 degrees to the optical path A, and the laser beam of a second wavelength λ2 output from the optical signal processing unit 104 is reflected on the optical filter 106, and thereafter, travels on the optical path A similarly as the laser beam of a first wavelength λ1.

The optical filter 107 is a filter for reflecting the laser beam of a third wavelength λ3 toward the optical signal processing unit 105 and for transmitting the beam of other wavelengths, and similar to the optical filter 106, it is a frequency-dependent half mirror formed of a dichroic mirror. The optical filter 107 is disposed at an angle of 45 degrees to the optical path A, and the laser beam of a third wavelength λ3 output from the optical signal processing unit 105 is reflected on the optical filter 107, and thereafter, travels on the optical path A similarly as the laser beams of wavelengths λ1 and λ2.

Plural motors 110, 111 are connected via an electric cable 114 to the control unit 102. The motor 110 is a motor controlled by the control unit 102, and it rotates in response to a control signal output from the control unit 102 and drives the movable case 113 to rotate in direction X via the rotary drive mechanism 1101. The motor 111 is a motor controlled by the control unit 102, and it rotates in response to a control signal output from the control unit 102 and drives the reflecting mirror 112 to rotate in direction Y which is orthogonal to direction X via the rotary drive mechanism 1111. The amount of rotation of the movable case 113 from a predetermined position and the amount of rotation of the reflecting mirror from a predetermined position are each detected by an encoder mechanism equipped to the rotary drive mechanism 1101 and the rotary drive mechanism 1111, respectively.

The control unit 102 computes a deviation quantity data representing a quantity of displacement (quantity of deviation) of the laser beam being output to the object to be measured via the reflecting mirror 112 based on the position of the laser beam (return beam) detected by the PSD 117, computes a quantity of correction of the reflecting mirror 112 so that the quantity of deviation becomes zero, controls the motors 110 and 111 so that the quantity of deviation equals zero, and rotates the movable case 113 and the reflecting mirror 112.

The communication I/F 108 is an interface for sending the data computed at the control unit 102 (data such as the distance from a predetermined point to the object, the shape of the object and the traveling speed of the object) via an antenna 109 to another electric device (such as a computer for performing data aggregation) through radio transmission.

The optical filters 106, 107 and the reflecting mirror 112 are disposed on a common optical path A, and the laser beams output from the optical signal processing units 103 through 105 toward the object to be measured and the laser beams returning from the object to the optical signal processing units 103 through 105 travel via the optical path A.

Although not shown, the laser measurement apparatus 101 can be equipped with an internal battery for driving the apparatus, or if the apparatus is designed to operate via an external AC power supply, it can be equipped with a slip ring or a transformer unit.

The optical filters 106, 107 and the reflecting mirror 112 constituting an optical guiding means constitute an optical path means. The rotary drive mechanisms 1101, 1111 including motors 110, 111 together with the control unit 102 constitute a control means for controlling the direction of the reflecting mirror 112. The polarized beam splitters 116, 205, the optical position sensitive detector 117 and the photodetector 206 constitute an optical detecting means. The optical signal processing unit 103 constitutes a position sensing means, and the optical signal processing units 104, 105 together with the control unit 102 constitute a measuring means. The laser beam generating units included in the optical signal processing units 104, 105 constitute a measuring laser beam generating means, and the laser beam generating unit 115 included in the optical signal processing unit 103 constitutes a tracking laser generating means.

The operation of the laser measurement apparatus 101 according to a first embodiment of the present invention will be described in detail with reference to FIGS. 1 and 2.

First, when the laser measurement apparatus 101 is activated by having the power turned on, the laser measurement apparatus 101 starts to operate in a searching mode in which it detects the object to be measured by controlling the direction of the reflecting mirror 112 via rotary drive mechanisms 1101, 1111 including motors 110, 111 (a rotary drive mechanism having two-degree-of-freedom is constituted by rotary drive mechanisms 1101 and 1111).

According to the searching mode, the control unit 102 drives the motors 110 and 111 so that the laser beam reflected on the reflecting mirror 112 is output toward the object of measurement (actually, a corner cube 100 attached to the object of measurement).

In other words, according to the searching mode, the control unit 102 controls the rotation of the motors 110 and 111 until the transverse wave with wavelength λ1 of the return beam reflected on the object (actually, the corner cube 100 attached to the object) is detected at a predetermined position of the PSD 117 (for example, at the center of PSD 117). Thus, the rotary drive mechanisms 1101, 1111 control the direction of the reflecting mirror 112 so that the transverse wave with wavelength λ1 of the return beam is detected at a predetermined position of the PSD 117.

Here, the control unit 102 constitutes a searching control means. There are plural search patterns, including an orthogonal locus pattern, a diagonal locus pattern and a circular locus pattern (spiral or concentric), prepared and stored in advance in a memory (storage means) of the control unit 102 as standard control patterns (search patterns) for controlling the reflecting mirror 112, based on which the reflecting mirror 112 is driven to change directions with time to perform the search. The control unit 102 performs the search by selecting a search pattern designated via a manipulation unit (not shown).

When the searching mode is ended, the laser measurement apparatus is shifted to a tracking control mode for tracking a moving object to be measured. A tracking control mode is a mode in which the control unit 102 controls the rotation of the motors 110, 111 so that the laser beam with a wavelength λ1 reflected on the object returns to a predetermined position of the PSD 117 (for example, the origin of coordinates), so as to direct the laser beam output from the laser measurement apparatus 101 toward the object to be measured (actually, the corner cube 100 attached to the object) following the movement of the moving object.

In other words, according to the tracking control mode, the control unit 102 controls the rotation of motors 110 and 111 so that the transverse-wave return beam reflected on the polarized beam splitter 116 is returned to a predetermined position (such as the origin of coordinates) of the optical position sensitive detector 117. At this time, the control unit 102 constitutes a tracking control means. Thus, the laser beam output from the laser beam generating units 115, 201, 204 of the optical signal processing units 103 through 105 captures the object to be measured.

The tracking control mode is described hereafter in further detail. When the object is moving, the position of the return beam is displaced from the predetermined position of the PSD 117. The control unit 102 carries out an operation for determining the X-axis component and the Y-axis component of the quantity of displacement (quantity of deviation) of the return beam, and computes the quantity of correction of the X-axis component and the Y-axis component. The quantity of correction is set as a rotation correction quantity of the movable case 113 and a rotation correction quantity of the reflecting mirror 112, which are utilized for feedback control. In other words, the control unit 102 controls the motors 110, 111 to rotate corresponding to the quantity of correction determined for the X-axis component and the quantity of correction determined for the Y-axis component, according to which the laser beam $\lambda 1$ is capable of tracking the object to be measured at all times.

According to the tracking control mode, the return beam of wavelength $\lambda 2$ from the object returns to the optical signal processing unit 104 and is detected by the photodetector 206. The phase difference comparator 204 detects the phase difference between the detection output signal from the photodetector 206 and the output signal from the high frequency generator 203, and a signal representing the detected phase difference (phase difference signal) is output to the control unit 102. Based on the phase difference signal, the control unit 102 computes the distance r to the object from a predetermined position (such as a center of the reflecting mirror 112) set as a reference. Thus, a measurement is performed to measure a short distance according to the longer first scale.

When the control unit 102 functions as a position computing means for computing the position of the object based on the output signal from the optical signal processing unit 104 and setting a predetermined position as reference, the control unit 102 determines a quantity of rotation θ of the reflecting mirror 112 driven by the rotary drive mechanism 1101 from a predetermined position and a quantity of rotation ø of the movable case 113 driven by the rotary drive mechanism 1111 from a predetermined position based on signals from encoder units of the rotary drive mechanisms 1101 and 1111. Then, based on the signals from the photodetector 206 and setting the above-described predetermined position as reference, the control unit 102 computes the positional information (r, θ, ø) of the object in a spherical coordinate system.

Data such as the positional information computed at the control unit 102 is sent from the control unit 102 via the communication I/F 108 and the antenna 109 to another electronic device (such as a computer for performing data aggregation) through radio transmission.

The control unit 102 can be designed to perform other computations, such as the measurement of a center distance between a plurality of points. Moreover, the control unit 102 can be designed to compute time using an internal clock of the control unit 102 as a reference in order to compute the speed and the acceleration of the object in three-dimensional space based on the distance information and the positional information of the object.

When a distance measurement is performed based on a second scale which is a shorter scale, the optical signal processing unit 105 utilizes the laser beam having a wavelength of $\lambda 3$ to carry out a similar process as described above. Thus, a distance measurement based on the second measurement scale which is longer than the above-described first measurement scale is carried out.

Next, we will describe the details of a scanning mode, which is a mode for carrying out a static measurement such as the measurement of the shape of the object or the distance between predetermined points.

According to the aforementioned searching mode, searching is carried out based on a predetermined search pattern using a laser beam with a wavelength of $\lambda 1$ until a return laser beam is captured at a predetermined detecting region of the PSD 117, and accordingly, the PSD 117 detects the return laser beam.

On the other hand, the scanning mode is a mode for measuring the shape of a static object or a slowly moving object and the like in a state where the object has been captured via the searching mode. In other words, according to the scanning mode, the control unit 102 outputs demands to the motors 110, 111 for performing a scan using an appropriate pattern with the laser beam to the area including the static or slowly moving object.

In this mode, the return beam with a wavelength of $\lambda 2$ from the object is returned to the optical signal processing unit 105, detected by the photodetector 206, and subjected to phase difference detection at the phase difference comparator 204, based on which a predetermined data processing is performed at the control unit 102 in real time. When the control unit 102 functions as a shape computing means for computing the shape of the object based on the output signal from the optical signal processing unit 104, the control unit computes the shape, such as the curved surface, of the object.

Data such as the shape of the object computed at the control unit 102 is sent from the control unit 102 via the communication I/F 108 and the antenna 109 to another electronic device (such as a computer for performing data aggregation) through radio transmission.

When performing measurement based on a second scale in which an object having a small size is to be measured, the optical signal processing unit 105 utilizes a laser beam with a wavelength of $\lambda 3$ to carry out a similar process as described above. Thus, shape measurement based on the second measurement scale which is shorter than the first measurement scale is carried out using the optical signal processing unit 105, and the measurement of a shape or the like of an object having a smaller size is performed.

Further according to the above-described first embodiment of the present invention, components other than the reflecting mirror 112 and the rotary drive mechanism 1111 including the motor 111, such as the control unit 102, the optical signal processing units 103 through 105 and communication I/F 108, were stored in the movable case 113. However, it is also possible to store only the reflecting mirror 112 and the rotary drive mechanism 1111 including the motor 111 in the movable case 113, and to store the other components in the main case 118.

Further, it is possible to adopt an optical fiber cable to the optical path A. (See, for example, optical fiber 119 represented in phantom in FIG. 1). In such case, it is possible to separate the reflecting mirror 112 and the rotary drive mechanisms 1101 and 1111 from the main case 118, to connect the reflecting mirror 112 via the optical fiber cable to the optical path A and to control the rotary drive mechanisms 1101, 1111 by the control unit 102 in a similar manners described above so as to control the direction of the reflecting mirror 112.

Figure 3:
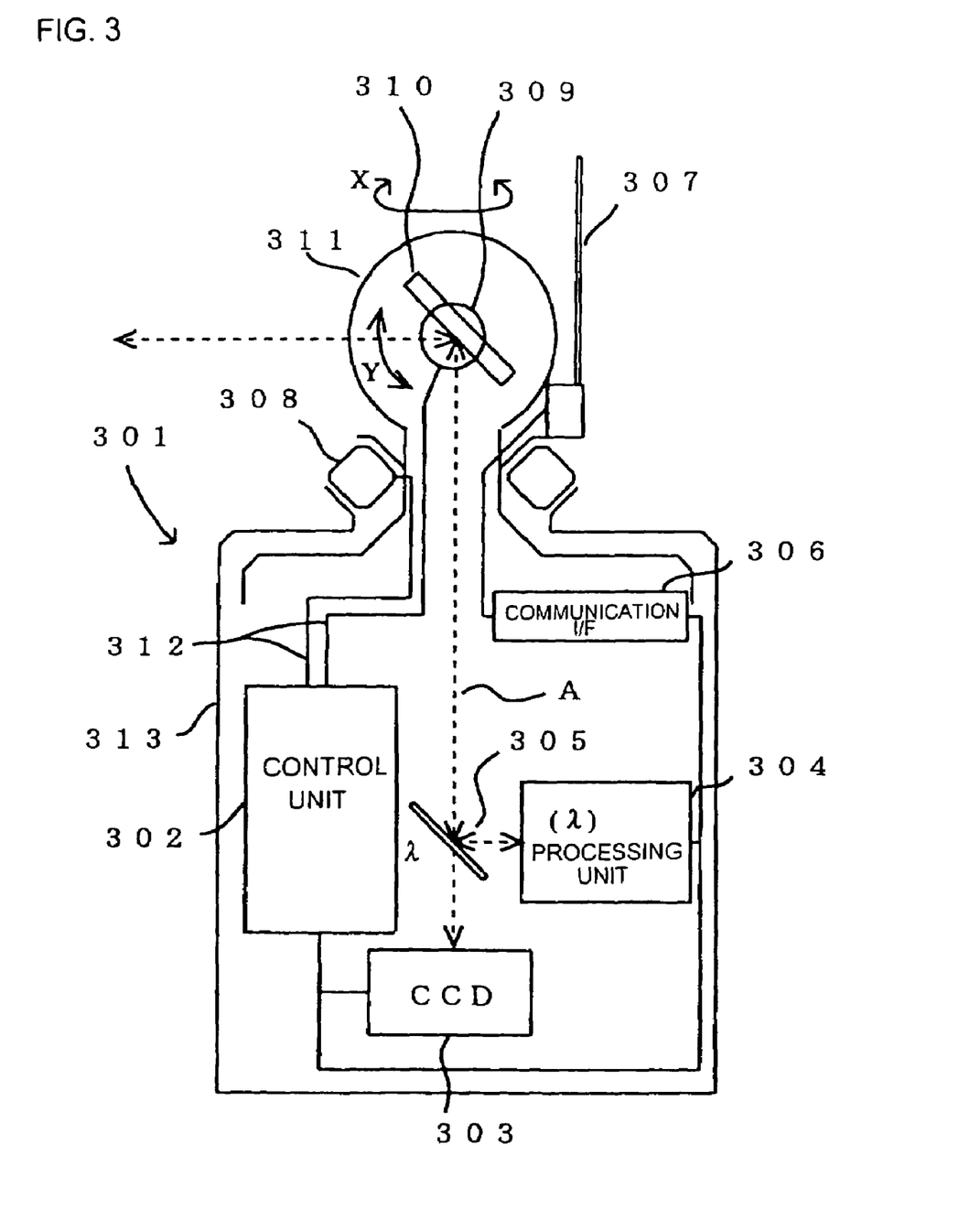
FIG. 3 is a schematic view of a laser measurement apparatus according to a second embodiment of the present invention.

FIG. 3 is a schematic view of a laser measurement apparatus according to a second embodiment of the present invention. The second embodiment of the present invention is an example in which a specific color is used as the tracking object.

In FIG. 3, a laser measurement apparatus 301 comprises a color image detecting device (color CCD: charge coupled device) 303 constituting a color identification device, an optical signal processing unit 304, an optical filter 305, a communication interface (I/F) 306 for data communication, an antenna 307, a plurality of motors 308, 309, a reflecting mirror 310, and a control unit 302.

A main case 313 houses the control unit 302, the CCD 303, the optical signal processing unit 304, the optical filter 305, the communication I/F 306 and the motor 308, and the antenna 307 is attached to the main case 313 so as to protrude outward.

The main case 313 is fixed to a predetermined position for use. A movable case 311 houses the motor 309 and the reflecting mirror 310. The motor 309 and the reflecting mirror 310 constitute a galvanometer mirror. The first embodiment of the present invention utilizes a rotary drive mechanism 1101, 1111 with motors 110, 111, but the present embodiment utilizes stepping motors 308, 309. Accordingly, the control unit 302 is capable of recognizing the amount of rotation in directions X and Y based on the number of pulses supplied to the stepping motors 308, 309.

The reflecting mirror 310 is supported at a predetermined position within the movable case 311 so as to be able to rotate in direction Y (that is, within a plane parallel to the face of the sheet). The reflecting mirror 310 is driven to rotate in direction Y via the motor 309. The center of rotation of the reflecting mirror 310 when being driven to rotate in direction Y by the motor 309 is on the optical path A, and the rotation axis of the reflecting mirror 310 when being driven to rotate in direction Y by the motor 309 is orthogonal to the optical path A.

The movable case 311 is supported via a rotary mechanism on the main case 313 and capable of being rotated in direction X (that is, within a plane orthogonal to the face of the sheet), and is driven to rotate in direction X by the motor 308. The rotary axis of the movable case 311 is set to be parallel to the optical path A. In other words, the rotation axis of the movable case 311 is orthogonal to the rotation axis of the reflecting mirror 310 being rotated by the motor 309. The rotary mechanism comprises a rotary drive function and an encoder function for detecting the quantity of rotation of the movable case 313, and is capable of rotating the movable case 313 continuously.

The control unit 302 controls the whole laser measurement apparatus 301, and controls the components of the laser measurement apparatus 301 such as the motors 308, 309. Further, the control unit 302 computes the shape of the object to be measured, the position, the moving speed, the moving direction, the distance to the object from a given point and so on, based on signals detected at the optical signal processing unit 304.

The color image detecting device 303 is a color identification device capable of identifying color, composed of a CCD capable of detecting color. The color image detecting device 303 has a function (same function as a PSD) to detect the position of the received light upon receiving a converged light such as a laser beam. Moreover, the color image detecting device 303 has an image recognition function, and is capable of recognizing the shape of the object based on the light received from the object.

Thereby, the color image detecting device 303 has a function to detect the position of a converged light (such as a laser beam) having a specific color (specific waveband) received from the object via the reflecting mirror 310, the optical path A and the beam splitter 305, and outputs the positional information of the converged light being received as output signal to the control unit 302. Therefore, by using the positional information signal output from the color image detecting device 303, it becomes possible to track the object to be tracked, as described later.

The optical signal processing unit 304 is formed similarly as the optical signal processing unit 104 according to the first embodiment. Further, the laser beam output from the optical signal processing unit 304 is used to measure the distance between a predetermined reference position and the object, the position of the object with the predetermined position set as reference, the shape of the object, or the distance between plural points.

Plural motors 308, 309 are connected via an electric cable 312 to the control unit 302. The motor 308 is a motor whose rotation is controlled by the control unit 302, and it drives the movable case 311 in direction X in response to a control signal from the control unit 302. The motor 309 is a motor whose rotation is controlled by the control unit 302, and it drives the reflecting mirror 310 in direction Y which is orthogonal to direction X in response to a control signal from the control unit 302.

The control unit 302 computes a deviation quantity data representing the quantity of displacement (quantity of deviation) of the reflecting mirror 310 based on the position of the light having a specific color detected by the CCD 303, computes a quantity of correction of the reflecting mirror 310 so that the above-mentioned quantity of deviation equals zero, controls the rotation of motors 308 and 309 so that the above-mentioned quantity of deviation equals zero, and drives the movable case 311 and the reflecting mirror 310 to rotate so that the above-mentioned quantity of deviation equals zero.

The control unit 302 controls the rotation of the motors 308, 309 so that the CCD 303 constantly detects the object to be tracked having the predetermined color. During the state where the CCD 303 is tracking and detecting the object to be tracked having the predetermined color, the laser beam output from the optical signal processing unit 304 is radiated to the object of measurement which is at the same position as the object to be tracked having the predetermined color, and the laser beam returning from the object of measurement is returned to the optical signal processing unit 304.

The communication I/F 306 is an interface for sending the data computed at the control unit 302 (such as the shape of the object to be measured, the distance to the object from a predetermined position or the moving speed of the object) via an antenna 307 to another electronic device (such as a computer for performing data aggregation) through radio transmission.

The optical filter 305 and the reflecting mirror 310 are disposed on a common optical path A, and the laser beam output from the optical signal processing unit 304 toward the object to be measured and the laser beam returning from the object toward the optical signal processing unit 304 are set to travel on the optical path A. Further, the light coming from the outside received by the CCD 303 is also set to travel on the optical path A.

Although not shown, the laser measurement apparatus 301 can be equipped with an internal battery for driving the apparatus, or if the apparatus is designed to operate via an external AC power supply, it can be equipped with a slip ring or a transformer unit.

The control unit 302 and the optical signal processing unit 304 constitute a measuring means, the filter 305 and the reflecting mirror 310 constituting the optical guiding means constitute an optical path means. The color CCD 303 which is a color identification device constitutes a position detecting means. The motors 308 and 309 together with the control unit 302 constitute a control means for controlling the rotation of the reflecting mirror 310.

Figure 4:
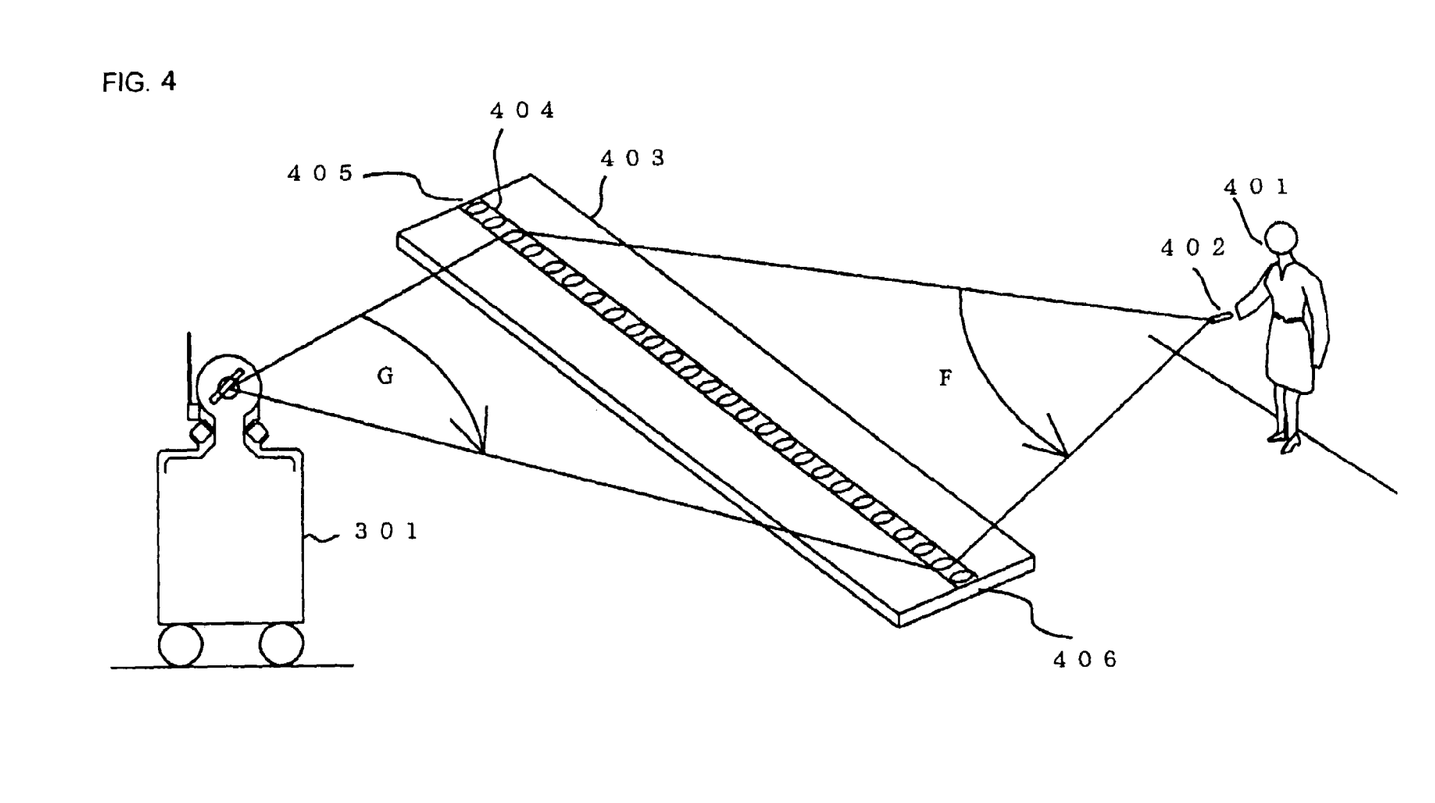
FIG. 4 is an explanatory view of the laser measurement apparatus according to the second embodiment of the present invention.

FIG. 4 is an explanatory view explaining an operation according to the second embodiment of the present invention shown in FIG. 3, wherein the components equivalent to those in FIG. 3 are denoted with the same reference numbers.

FIG. 4 shows an example in which the laser measurement apparatus 301 is equipped with wheels enabling the apparatus 301 to be moved. Reference number 403 denotes a plate member which is the object of measurement. Reference number 402 is a position indicator (for example, a laser pointer) for indicating the measurement position (in other words, the object to be tracked) of the plate member 403, which outputs a converged light (for example, a laser beam) of a predetermined color (for example, red). A user 401 uses the position indicator 402 to point a red laser beam onto the desired position of the plate member 403. Thus, a red light spot 404 is indicated on the plate member 403 by the red laser beam. The red light spot 404 is the object to be tracked according to the present embodiment, and the position indicated by the light spot 404 is the object to be measured.

Now, with reference to FIGS. 3 and 4, a tracking mode according to the second embodiment of the present invention for tracking the object to be tracked and measuring the object to be measured will be explained, which is the characteristic feature of the second embodiment.

At first, the user 401 points the red light spot 404 on one end portion 405 of the plate member 403 using the position indicator 402 to show the position of the end portion 405 of the plate member 403.

The laser measurement apparatus 301 is operated by the searching mode according to which the control unit 302 controls via the motors 308 and 309 the direction of the reflecting mirror 310 so that the red light spot 505 being the object to be tracked is detected by the CCD 303, and thereafter, the mode of the apparatus is changed to the tracking mode.

During the tracking mode, when the user 401 moves the red light spot 404 from one end portion 405 of the plate member 403 to the other end portion 406 in direction F by moving the position indicator 402 in direction F, the control unit 302 controls the rotation of motors 308 and 309 so that the light from the red light spot 404 is returned to the predetermined position of the CCD 303 (for example, a predetermined origin of coordinates). Thereby, the CCD 303 is capable of detecting the red light spot 404 while tracking the movement of the red light spot 404.

At the same time, the control unit 302 radiates the laser beam from the laser beam processing unit 304 of the laser measurement apparatus 301. The laser beam output from the laser beam processing unit 304 is radiated to the position indicated by the red light spot 404 on the plate member 403, so the radiated position of the laser beam is moved in such a manner so as to track the movement of the red light spot 404.

In other words, according to the tracking mode, the control unit 302 controls the rotation of the motors 308 and 309 so that the light from the red light spot 404 always returns to the predetermined position of the CCD 303. At this time, the control unit 302 constitutes a tracking control means. Thereby, the laser beam output from the laser beam generating unit of the optical signal processing unit 304 captures the position of the red light spot 404 on the plate member 403 which is the object to be measured.

When the object to be tracked 404 moves, the position of the light received by the CCD 303 is deviated from the predetermined position of the CCD 303. The control unit 302 computes the X-axis component and the Y-axis component of the quantity of displacement (quantity of deviation), and calculates a quantity of correction of the X-axis component and the Y-axis component. This quantity of correction is used as a rotation correction quantity of the movable case 311 and a rotation correction quantity of the reflecting mirror 310 to carry out a feedback control. In other words, the control unit 302 controls the rotation of motors 308 and 309 according to the quantity of correction of the X-axis component and the quantity of correction of the Y-axis component, by which the laser beam X can constantly track the red light spot 404 which is the object to be tracked.

According to this tracking mode, the laser beam with wavelength λ output from the optical signal processing unit 304 is reflected on the position of the red light spot 404 on the plate member 403, and the return beam from the plate member 403 is returned to and detected by the optical signal processing unit 304. The user 401 can move the red light spot 404 from one end portion 405 of the plate member 403 to the other end portion 406 thereof so as to move the laser beam output from the optical signal processing unit 304 from one end portion 405 of the plate member 403 to the other end portion 406 thereof.

At this time, based on the quantity of rotation of the motors 308 and 309 and the signals detected by the optical signal processing unit 304, the control unit 302 carries out a predetermined data processing, and the length of the plate member 403 is computed. The laser measurement apparatus can recognize that a certain point is the end portion of the plate member 403, in other words, that the point being detected is one end portion 405 or the other end portion 406, for example, by the change of light intensity detected by the optical signal processing unit 304, since the light intensity reflected on the corner portion of the plate member 403 differ from that reflected on other portions.

As explained, by using a specific color as the object to be tracked, it becomes possible to guide the position of measurement of the laser measurement apparatus 301 remotely using a laser pointer or the like, and thus, it becomes possible to carry out measurement of a desired object to be measured. As for color information, by handling the sensitivity evaluation in a quantitative manner, the present apparatus can carry out a highly accurate tracking control. Further, regarding the determination of the sameness or approximation of colors, by quantifying the colors through a sensitivity-engineering approach using fuzzy control or the like, the determination accuracy can be enhanced.

Further, the second embodiment of the present invention was exemplified by an example in which a red light spot 404 being the object to be tracked is tracked in order to measure the length of a plate member 403 being the object of measurement, but various modifications can be made.

For example, when the control unit 302 functions as a position computing means for computing a specific position on the plate member 403 based on the output signal of the optical signal processing unit 304 with a predetermined position (such as a center of the reflecting mirror 310) set as a reference point, by pointing the red light spot 404 onto a desired point on the plate member 403, the control unit 302 can determine the rotational position of the reflecting mirror 310 driven by the motor 309 and the rotational position of the movable case 311 driven by the motor 308, and compute, based on the output signal of the optical signal processing unit 304, the positional information, such as an XYZ coordinate (Z, Y, Z), of the object with the predetermined position set as the reference point.

It is also possible to mark off a point of division of a bipartition or a tripartition between plural specific points, such as by pointing the midpoint between one end portion 405 and the other end portion 406.

Figure 5:
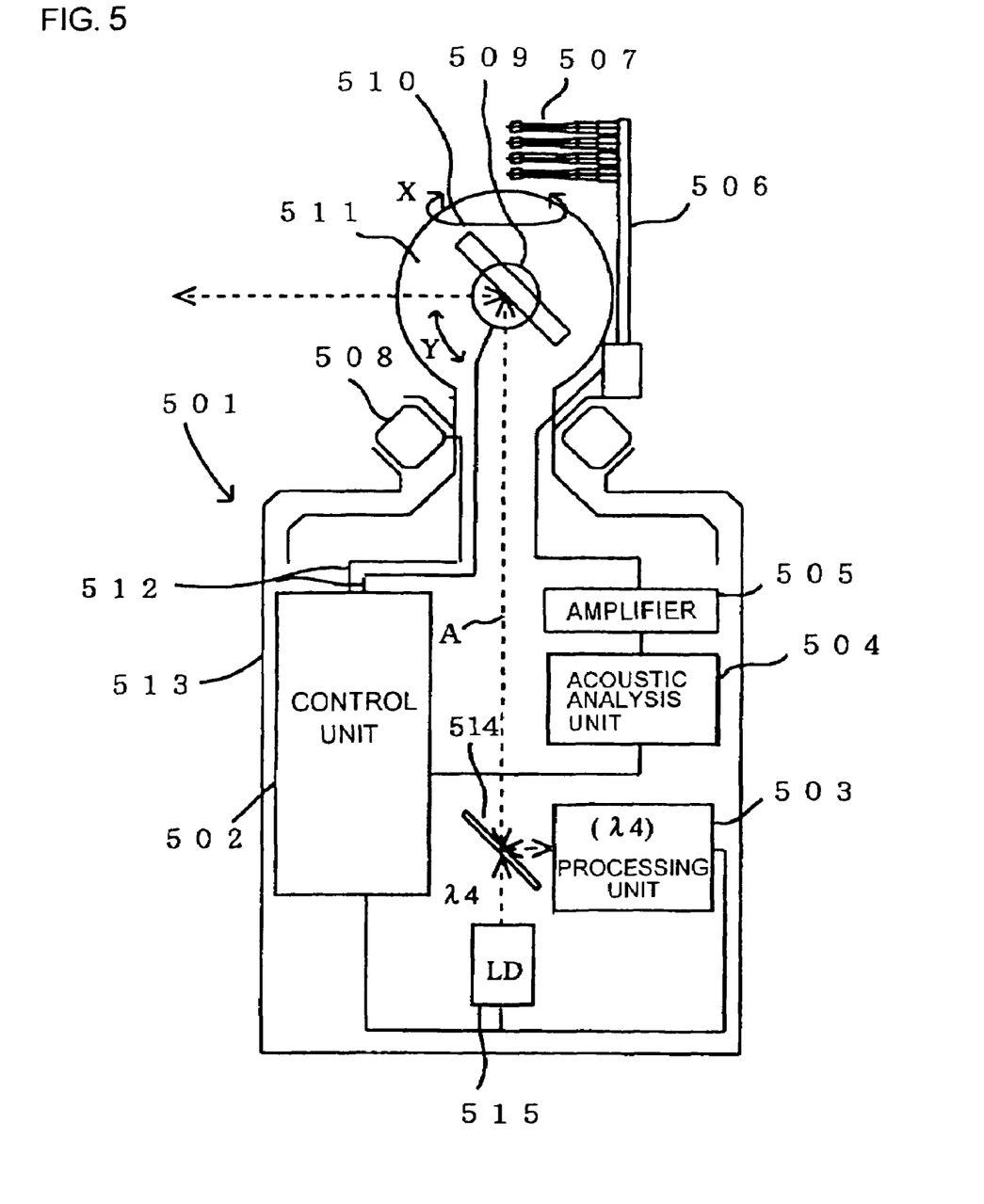
FIG. 5 is a schematic view of a laser measurement apparatus according to a third embodiment of the present invention.

FIG. 5 is a schematic view of a laser measurement apparatus according to a third embodiment of the present invention. The third embodiment is an example in which a specific sound is used as the object to be tracked.

As shown in FIG. 5, a laser measurement apparatus 501 comprises an optical signal processing unit 503, an acoustic analysis unit 504, an amplifier 505, plural motors 508, 509, a reflecting mirror 510, a control unit 502, an acoustic intensity probe 507 mounted via a mounting portion 506 to a movable case 511, an optical filter 514, and a radiating laser beam generating unit 515 for generating a laser beam for radiation used to radiate the sound source or the like. The laser beam output from the laser beam generating unit 515 is used as an intimidating laser beam to be radiated to the sound source or the like for intimidating purpose.

The acoustic intensity probe 507 includes plural (for example, 2 to 4) probes (sound intensity detector) having mutual positions set at predetermined distances, which is an acoustic detector for outputting as signals having plural scalar quantities the intensity of sound detected by each probe as acoustic signals, and it constitutes a sound detecting means.

A main case 513 houses a control unit 502, an optical signal processing unit 503, a stepping motor 508, an optical filter 514 and a laser beam generating unit 515. The optical signal processing unit 503 has a similar structure as the optical signal processing units 104 and 105 of FIG. 1, and houses in the interior thereof a measuring laser beam generating unit that constitutes a measuring laser beam generating means. It is also possible to use the measuring laser beam output from the measuring laser beam generating unit as the intimidating laser beam.

The main case 513 is fixed to a predetermined position for use. The movable case 511 houses a stepping motor 509 and a reflecting mirror 510. The motor 509 and the reflecting mirror 510 constitute a galvanometer mirror. Normally, the mounting unit 506 and the acoustic intensity probe 507 are disposed on the movable case 511, but they can also be disposed at other remote locations.

The reflecting mirror 510 is supported at a predetermined position within the movable case 511 so as to be able to rotate in direction Y (that is, within a plane parallel to the face of the sheet). The reflecting mirror 510 is driven to rotate in direction Y by the motor 509. The rotational center of the reflecting mirror 510 when being driven to rotate in direction Y by the motor 509 is on the optical path A, and the rotation axis of the reflecting mirror 510 when being driven to rotate in direction Y by the motor 509 is orthogonal to the optical path A.

The movable case 511 is supported via a rotation mechanism on the main case 513 so as to be able to rotate in direction X (that is, within a plane orthogonal to the face of the sheet), and is driven to rotate in direction X by the motor 508. The rotation axis of the movable case 511 is formed to be parallel to the optical path A. In other words, the rotation axis of the movable case 511 is designed to be orthogonal to the rotation axis of the reflecting mirror 510 driven to rotate by the motor 509. The rotation mechanism has a rotary drive function and an encoder function for detecting the quantity of rotation of the movable case 513, and is capable of rotating the movable case 513 continuously.

The control unit 502 controls the whole laser measurement apparatus 501, and also controls the components of the laser measurement apparatus 501 such as the motors 508 and 509. The control unit 502 carries out computing processes for computing the shape, the position, the moving speed and the moving direction of the object to be measured, and the distance from a predetermined point to the object to be measured, based on signals detected at the optical signal processing unit 503.

The acoustic signal detected through the acoustic intensity probe 507 is amplified at the amplifier 505, and thereafter, analyzed at the acoustic analysis unit 504. The acoustic analysis unit 504 analyzes the acoustic signals from the acoustic intensity probe 507 (signals indicating the intensity of sound from each probe represented by plural scalar quantities), and outputs acoustic data signals representing the intensity of the sound being the object to be tracked and the direction of the sound source (vector quantity) to the control unit 402.

The control unit 502 controls the direction of the reflecting mirror 510 by controlling the rotation of motors 508 and 509 based on the acoustic data signals from the acoustic analysis unit 504 so that the measuring laser beam output from the optical signal processing unit is radiated via a polarized beam splitter 514 on the object to be measured that is positioned at the same position as the object to be tracked. In the state where the returning laser beam from the object to be measured that is positioned at the same position as the object to be tracked is detected by the optical signal processing unit 503, if there is a need to intimidate the object being measured, an intimidating laser beam is radiated to the object from the laser beam generating unit 515.

If the apparatus is used only to measure the object to be measured, the laser beam generating unit 515 is not necessarily required. However, the apparatus can be designed to perform intimidation using laser beams output from the laser beam generating unit 515 when it determines that an abnormal situation has occurred, such as a break-in by a burglar, based on the detection of a predetermined unusual sound.

The control unit 502 has plural motors 508, 509 connected thereto via an electric cable 512. The motor 508 is a motor whose rotation is controlled by the control unit 502, and drives the movable case 511 to rotate in direction X in response to the control signal from the control unit 502. The motor 509 is a motor whose rotation is controlled by the control unit 502, and drives the reflecting mirror 510 to rotate in direction Y which is orthogonal to direction X in response to the control signal from the control unit 502.

Further, the control unit 502 computes a deviation quantity data representing a quantity of displacement (quantity of deviation) of the direction of the reflecting mirror 510 based on the acoustic signal detected by the acoustic intensity probe 507, computes a quantity of correction of the reflecting mirror 510 so that the above quantity of deviation equals zero, controls the rotation of motors 508, 509 so that the above quantity of deviation equals zero, according to which the movable case 511 and the reflecting mirror 510 are driven to rotate. Thus, the control unit 502 controls the apparatus so that the object to be measured which also serves as the object to be tracked is detected via the reflecting mirror 510 by the optical signal processing unit 503.

The beam splitter 514 and the reflecting mirror 510 are disposed on the optical path A, and the laser beam output from the optical signal processing unit 503 toward the object and the laser beam returning from the object toward the optical signal processing unit 503 is set to travel on the optical path A. Although not shown, the laser measurement apparatus 501 can be equipped with an internal battery for driving the apparatus, or if the apparatus is designed to operate via an external AC power supply, it can be equipped with a slip ring or a transformer unit.

The control unit 502 and the optical signal processing unit 503 constitute a measuring means, and the beam splitter 514 and the reflecting mirror 510 that constitutes an optical guiding means constitute an optical path means. The motors 508, 509 together with the control unit 502 constitute a control means for controlling the direction of the reflecting mirror 510. The acoustic analysis unit 504, the amplifier 505 and the acoustic intensive probe 507 constitute a sound source detecting means for detecting a specific sound source (the direction, the intensity and the frequency characteristics of the sound), and they also constitute a position detecting means for detecting the position of the sound source.

Figure 6:
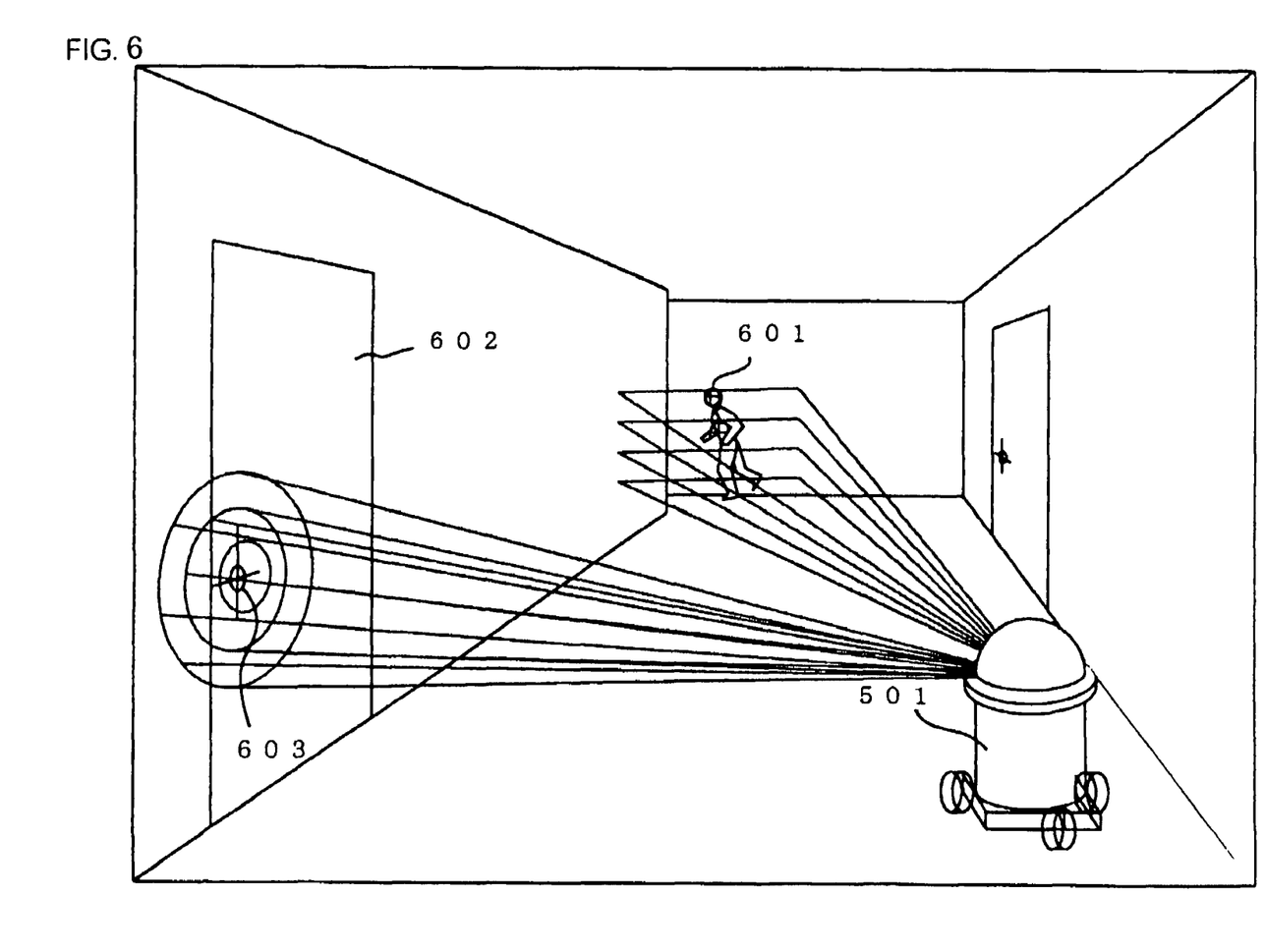
FIG. 6 is an explanatory view showing the operation of the laser measurement apparatus according to the third embodiment of the present invention.

FIG. 6 is an explanatory view explaining the operation of the third embodiment shown in FIG. 5, wherein the component equivalent to that in FIG. 5 is denoted by the same reference number. In FIG. 6, the laser measurement apparatus 501 is equipped with wheels that enable the apparatus 501 to move. Reference number 601 denotes an intruder braking into a house, which (who) is the object to be tracked and also the object to be measured, 602 denotes a door of the room, and 603 denotes a door knob.

Now, with reference to FIGS. 5 and 6, the third embodiment of the present invention, especially a tracking mode for tracking the object to be tracked and for measuring the object to be measured, will be described in detail.

Now, it is assumed that the laser measurement apparatus 501 is operated in the searching mode and is acoustically scanning the interior of a house using the acoustic intensity probe 507. In this case, at the same time as performing the acoustic scan, it is also possible to control the reflecting mirror 510 appropriately so that the position and the shape of the knob 603 on the door 602 or the like is recognized through the optical signal processing unit 503.

In this state, when an intruder 601 breaking into the house makes a sound of a predetermined level or above (abnormal sound) in the hallway, the acoustic intensity probe 507 detects this abnormal sound which is set as the object to be tracked, and outputs an acoustic signal to compute the level of the sound and the direction of the sound source (in this example, the intruder 601).

The acoustic signal is amplified by the amplifier 505 and then analyzed by the acoustic analysis unit 504. Based on the acoustic signal from the acoustic intensity probe 507, the acoustic analysis unit 504 outputs an acoustic data signal that designates the intensity of the sound which is the object to be tracked and the direction of the sound source (intruder 601) to the control unit 502. Based on the acoustic data signal received from the acoustic analysis unit 504, the control unit 502 controls the rotation of the motors 508, 509 so that the intruder 601 being the object to be measured is detected via the reflecting mirror 510 and the beam splitter 514 by the optical signal processing unit 503.

Thereafter, the laser measurement apparatus 1 is operated through the tracking control mode. The direction of the reflecting mirror 510 is controlled to face the direction where the acoustic signal detected by the acoustic intensity probe 507 has the maximum vector. When analyzing the sound intensity, by setting the frequency range to be narrower than an ordinary sound pressure range, the influence of noises and derived sounds can be suppressed and the detection accuracy can be enhanced.

In this example, the object to be tracked is the generation point of the sound and the object to be measured (surveyed) is the intruder 601, and since the object to be tracked and the object to be measured is at the same position, the control unit 502 can measure the characteristic features such as the face and the posture of the intruder 601, and compute the position, the moving speed or the like of the intruder, based on the detected data at the optical signal processing unit 503.

It is also possible to store in advance the data of the characteristic features such as the face and posture of the resident in a storage means (not shown) of the control unit 502, and to determine whether the moving object is the resident or an intruder based on whether the characteristic features of the intruder 601 detected via the optical signal processing unit 503 match the data stored in the storage means.

At this time, since the laser beam output from the laser beam generating unit 515 is designed to travel on the optical path A, when the control unit 502 determines that the detected person 601 is an intruder, the laser beam generating unit 515 generates an intimidating laser beam with an intensity satisfying the predetermined safety standards and radiates the same onto the intruder 601 in order to intimidate the intruder. The color of the laser beam can be red, blue or any other color selected according to use. Thus, the apparatus can be used effectively to ensure the security of a house or the like.

As described, according to the third embodiment of the present invention, sound can be used to carry out a guidance control. According to the embodiment, the apparatus can recognize a moving object even if the object to be measured is not visible, so the initial tracking operation according to the tracking control can be facilitated. Further, the apparatus can be applied, for example, to crack down motorcycle gangs.

The present invention provides a laser measurement apparatus that uses laser beams to measure a moving object or a designated object by tracking the object to be tracked and detecting the position of the tracked object as needed. Further, by using the apparatus to intimidate an object such as an intruder, the apparatus can be used effectively to ensure the security of a facility.

What is claimed is:

1. A laser measurement apparatus comprising:
   a measuring laser beam generating means for outputting a measuring laser beam used to measure a characteristic of an object to be measured;
   an optical guiding means for controlling the direction in which the measuring laser beam travels;
   a measuring means for measuring the property of the object to be measured using the measuring laser beam returning from the object to be measured;
   a position detecting means for detecting the position of an object to be tracked; and
   a control means for controlling the optical guiding means so that the measuring laser beam is radiated to the object to be tracked based on the position of the object to be tracked detected by the position detecting means; wherein the position detecting means comprises a tracking laser generating means for radiating a tracking laser beam to the object to be tracked via the optical guiding means, and an optical position sensitive detector for detecting the tracking laser beam returning via the optical guiding means from the object to be tracked; and the measuring means measures the property of the object to be measured using the measuring laser beam returning from the object to be measured in a state where the measuring laser beam is controlled to be radiated to the object to be measured.

2. The laser measurement apparatus according to claim 1, wherein the position detecting means comprises a tracking laser generating means for radiating a tracking laser beam to the object to be tracked via the optical guiding means, and an optical position sensitive detector for detecting the tracking laser beam returning via the optical guiding means from the object to be tracked; and the control means controls the optical guiding means so that the tracking laser beam returning from the object to be tracked is returned to a predetermined position of the optical position sensitive detector.

3. The laser measurement apparatus according to claim 1, wherein the optical guiding means includes an optical fiber cable.

4. The laser measurement apparatus according to claim 1, wherein the position detecting means has a color identification device that detects a predetermined color via the optical guiding means, and the control means controls the optical guiding means so that the object to be tracked having the predetermined color is detected by the color identification device.

5. The laser measurement apparatus according to claim 1, wherein the position detecting means has a sound detecting means for detecting a loudness and direction of a sound, and the control means controls the optical guiding means so That a predetermined sound set as the object to be tracked is detected by the sound detecting means.

6. The laser measurement apparatus according to claim 5, further comprising an intimidating means for intimidating the direction from which the sound is detected when the sound detecting means detects the loudness and direction of a predetermined sound.

7. The laser measurement apparatus according to claim 2, wherein the optical guiding means includes an optical fiber cable.

* * * * *